US011092576B2

(12) United States Patent
Condron et al.

(10) Patent No.: US 11,092,576 B2
(45) Date of Patent: Aug. 17, 2021

(54) METHOD, SYSTEM, AND APPARATUS FOR GAS CHROMATOGRAPHY DEVICE WITH PRE-CHARGED LARGE VOLUME TO SMALL VOLUME INJECTION MODULE

(71) Applicant: VORGA CORP., Oakland, CA (US)

(72) Inventors: Cathie Condron, Oakland, CA (US); Justin Chen, New York, NY (US)

(73) Assignee: VORGA CORP., Oakland, CA (US)

( * ) Notice: Subject to any disclaimer, the term of this patent is extended or adjusted under 35 U.S.C. 154(b) by 125 days.

(21) Appl. No.: 16/368,383

(22) Filed: Mar. 28, 2019

(65) Prior Publication Data

US 2019/0317060 A1  Oct. 17, 2019

Related U.S. Application Data

(60) Provisional application No. 62/656,810, filed on Apr. 12, 2018.

(51) Int. Cl.
*G01N 30/16* (2006.01)
*G01N 30/86* (2006.01)
*G01N 30/02* (2006.01)

(52) U.S. Cl.
CPC ......... *G01N 30/16* (2013.01); *G01N 30/8675* (2013.01); *G01N 2030/025* (2013.01)

(58) Field of Classification Search
CPC ............... G01N 30/16; G01N 30/8675; G01N 2030/025; G01N 2030/146; G01N 30/14
See application file for complete search history.

(56) References Cited

U.S. PATENT DOCUMENTS

| | | |
|---|---|---|
| 3,583,399 A | 6/1971 | Ritsky |
| 4,414,857 A | 11/1983 | Brazhnikov et al. |
| 5,174,804 A | 12/1992 | Rehberg et al. |
| 5,252,490 A | 10/1993 | Elsohly et al. |
| 2002/0189447 A1* | 12/2002 | Thordarson ............ G01N 30/18 95/82 |
| 2007/0208511 A1 | 9/2007 | Glenn et al. |
| 2008/0257013 A1 | 10/2008 | Munari et al. |

\* cited by examiner

*Primary Examiner* — Benjamin R Schmitt
(74) *Attorney, Agent, or Firm* — Perkins Coie LLP

(57) ABSTRACT

The present invention contemplates a variety of improved techniques including an injection module pairable with an injection port of a gas chromatography device. The injection module can include a cylindrical body, a cap with permeable membrane, a first reservoir for a sample, and a second reservoir for a volume of solvent. An internal membrane can be disposed between the first reservoir and the second reservoir. The injection module can include a circular plunger creating a seal with an inner surface of the cylindrical body of the injection module and configured to expel the sample and solvent by gliding along the inner surface of the cylindrical body. A server can monitor analytes detected by the gas chromatography device and generate recommendations for a user of the gas chromatography device.

14 Claims, 7 Drawing Sheets

METHOD, SYSTEM, AND APPARATUS FOR GAS CHROMATOGRAPHY DEVICE WITH PRE-CHARGED LARGE VOLUME TO SMALL VOLUME INJECTION MODULE

CROSS-REFERENCE TO RELATED APPLICATIONS

This application claims priority to the U.S. Provisional Patent Application Ser. No. 62/656,810, filed Apr. 12, 2018, which is incorporated herein by this reference in its entirety.

TECHNICAL FIELD

The present invention relates to gas chromatography devices, and more specifically to a gas chromatography device with a pre-charged large volume to small volume injection port module.

BACKGROUND

Gas chromatography devices can be used in analytical chemistry to analyze compounds that can be vaporized without decomposition. Gas chromatography devices can be used to test the purity of a particular substance, separate different compounds of a mixture, and can help in identifying a compound.

Conventional gas chromatography devices require a syringe for injection of an analyte. Syringes do not allow accurate and reproducible injections of small amounts of analyte samples. Even the best syringes claim an accuracy of approximately 3%, and in unskilled hands, errors are much larger. Syringes can induce changes to the sample composition by cutting small pieces of material from a septum as the syringe injects sample through the septum. The cut pieces of material can block the syringe and prevent the syringe from filling the next time it is used. A fraction of the sample may get trapped in the cut pieces of material and released during subsequent injections. This can give rise to ghost peaks of an earlier analyte in a chromatogram. The open tip of the syringe can result in selective loss of more volatile components by evaporation.

SUMMARY

The disclosed technology involves a gas chromatography device having an injection port pairable with a pre-charged large volume to small volume injection module. The injection module includes a cylindrical body arranged to mate with an injection port of a gas chromatography device. The injection module includes a cap with a permeable membrane, a reservoir for the physical sample, a reservoir for a known volume of solvent, an internal membrane and fill line, a barcode, and a plunger. Plant product (e.g., barley, hops, or other plant flower) or chemical residue (e.g., suspected explosive material), is added into the injection module by removing the cap and adding into an opening of the injection module. Since the injection module is pre-charged with a known solvent and operates to clean the injection port during operation of the plunger, operation is greatly simplified. The injection module is reusable. A barcode, a GPS chip, and/or a miniature internet of things (IoT) chip can be used for tracking and analysis.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

Figure 1:
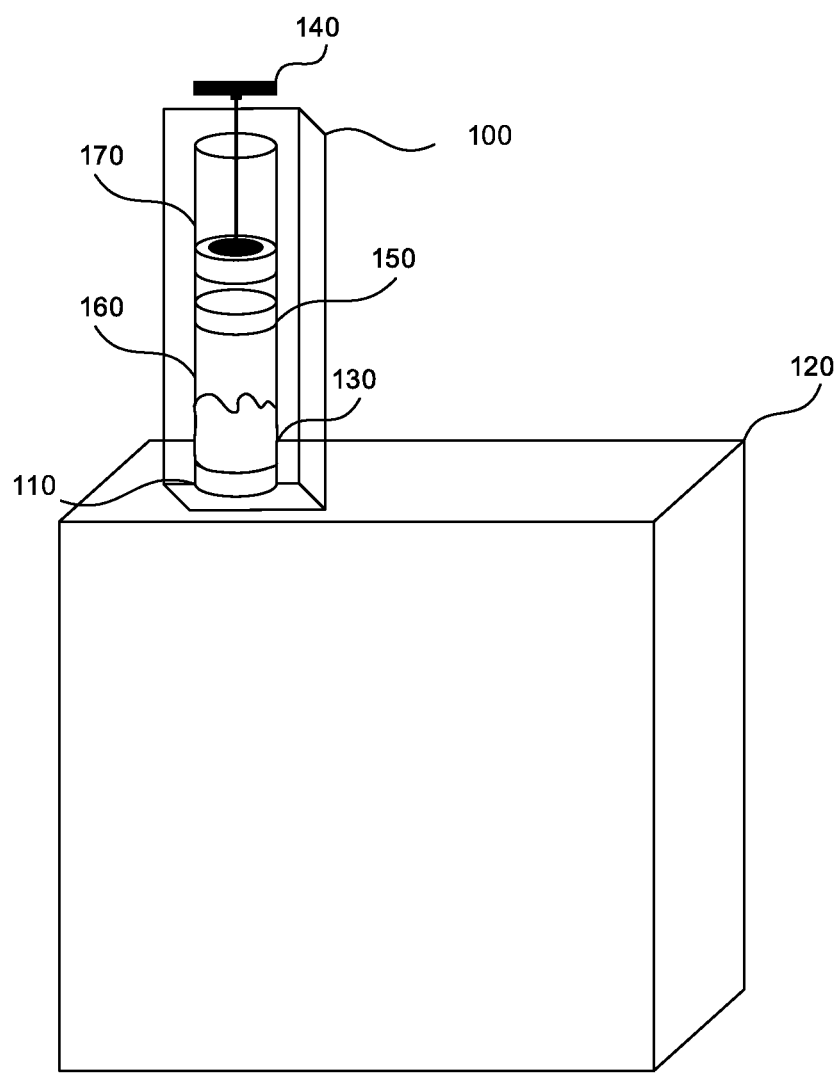
FIG. 1 illustrates a gas chromatography device compatible with an injection module.

Conventional gas chromatography devices need a syringe for analyte injections. Syringes have many limitations including failing to produce reproducible injections, contamination, and sample loss. Using a syringe to inject a specific volume of an analyte into a chromatograph is challenging even for experienced users. Contamination results from a syringe needle cutting small pieces of material from a septum which can end up inside of the syringe and/or inside of the chromatograph leading to ghost peaks from old samples. Sample loss can result from the open tip of the syringe which can be more dramatic for volatile compounds. Accordingly, an alternative injection device is needed to overcome limitations posed by syringe injection into a chromatograph.

The disclosed injection module overcomes limitations of a syringe by increasing injection reproducibility, reducing contamination, and reducing sample loss. The injection module includes a cylindrical body arranged to link with an injection port of a gas chromatography device. The injection module includes a cap with a permeable membrane and/or a semipermeable membrane. The cap can reduce evaporative loss of volatile compounds. The injection module includes a reservoir for a physical sample and a reservoir for a known volume of solvent. The physical sample can include a plant product (e.g., barley hops or other plant flower) and/or a chemical residue (e.g., suspected explosive material), or a combination of the two. The injection module includes an internal membrane disposed between the reservoir for the sample and the reservoir for the solvent. The injection module includes a plunger configured to expel at least a portion of the sample and the solvent from the injection module. The injection module includes a fill line. The fill line can increase injection reproducibility. The injection module can include a tracking device (e.g., a barcode, GPS chip, and/or IoT chip). The tracking device can be used for tracking and analysis of an analyte and/or sample. Analyte is a substance whose chemical constituents are being identified and measured. The sample can include one or more analytes.

The cap can be removed from the injection module to expose an opening of the injection module. The physical sample can be added into the opening of the injection module. The injection module is pre-charged with a known solvent. A portion of the sample can dissolve in the solvent. The plunger can expel a dissolved portion of the sample and the solvent from the injection module. As the solvent is expelled via operation of the plunger, the solvent cleans the injection port. The injection module can be refilled with a solvent and reused.

The disclosed technique includes methods for sample tracking and analysis. Tracking devices affixed to samples can be used to monitor parameters (e.g., a location and status) of physical samples. Chromatograph data indicative of peaks along a given spectrum can be generated. Comparative analysis can be employed to identify correspondence between the generated chromatograph data of a particular sample and one or more spectra stored in a spectra library. The identified correspondence is used to identify one or more analytes present in the particular sample.

The disclosed chromatography apparatus can be used as part of a horticulture management system. The horticulture management system can fetch data from one or more network-connected devices associated with a plant. The network-connected devices can include, for example, a chromatograph, a thermometer, a heat flux sensor (e.g., a pyranometer and/or Gardon gauge), a soil moisture sensor (e.g., a frequency domain sensor), a humidity sensor (e.g., a humistor), a photodetector, a pressure sensor, or any combination thereof. The horticulture management system can generate instructions for tending to the plant based on the fetched data.

As illustrated in FIG. 1, the disclosed technique employs an injection module 100 configured to link with an injection port 110 of a gas chromatography device 120. The injection module 100 is configured to deliver a sample 130 into the injection port 110 of the gas chromatography device 120 by operation of a plunger 140. The injection module 100 includes an internal membrane 150 that divides a sample reservoir 160 from a solvent reservoir 170. A solvent in the solvent reservoir 170 can vaporize and cross the internal membrane to the sample reservoir. The concentration of the solvent in the gas phase can be a function of the vapor pressure of the solvent. The portion of vapor phase solvent that crosses the internal membrane 150 can be a function of an equilibrium potential.

A portion of the solvent that enters the sample reservoir 160 can mix with a sample in the sample reservoir 160 of the injection module 100. The portion of the sample that mixes with the solvent can be in a gas phase. The concentration of the sample in the gas phase can be a function of the vapor pressure of the gas.

The injection port can receive the sample from the injection module 100 and pass the sample to a capillary column 200, as discussed below with reference to FIG. 2. The gas mixture is directed through a capillary column 200. A thermal control device can heat the capillary column 200 and control the temperature of the gas mixture. The gas mixture can be separated within the gas chromatography device 120. The process of separating the compounds in a mixture can be carried out between a liquid stationary phase and a gas mobile phase.

Figure 2:
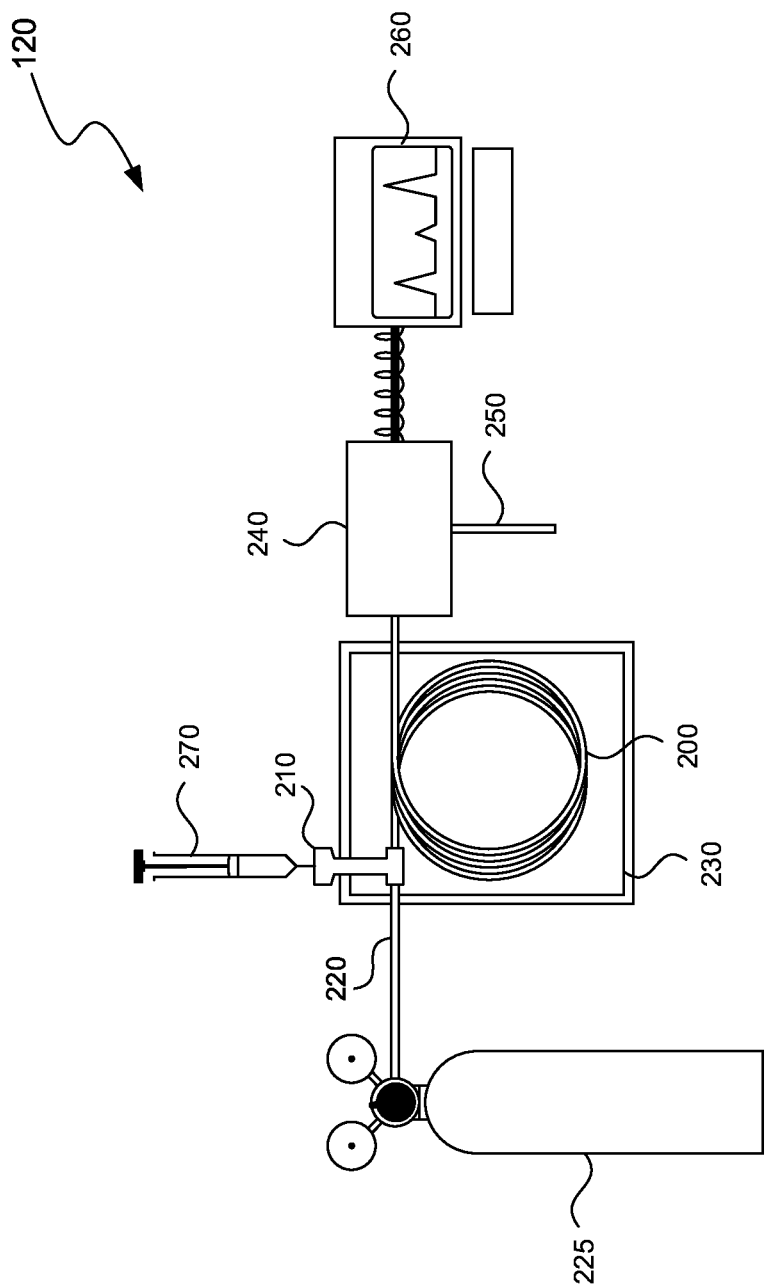
FIG. 2 is an exploded diagram illustrating a gas chromatography device.

FIG. 2 is an exploded diagram illustrating a gas chromatography device 120 in FIG. 1. The gas chromatography device 120 can include an injection port 210, a gas carrier connection 220, a gas carrier container 225, a capillary column 200, a column oven 230, an analyte detector 240, and an exhaust valve 250. The gas chromatography device 120 can generate a chromatogram 260.

The injection port 210 is configured to link with the injection module 270. For example, the injection module 270 can include a fastener and the injection port 210 can include a complementary fastener. The fasteners are hardware devices that mechanically join the injection port 210 and injection module 270 together. A force (e.g., torsion) can be applied to the injection module 270 to attach and unattach the injection module 270 from the injection port 210. Fastening the injection module 270 to the injection port 210 can create a seal. The seal can prevent or limit a gas (or liquid) from escaping. For example, as a gas (or liquid) mixture of solvent and sample are transferred from the injection module 270 to the injection port 210, the seal can prevent the gas (or liquid) mixture from escaping. The injection port is attached to a head of the capillary column 200. The injection port can pass a sample from a linked injection module 270 to the capillary column 200.

The gas chromatography device 120 includes a capillary column 200 that promotes separation of the molecules in a mixture. Molecule separation can vary based on the column's 200 dimensions (e.g., length, diameter, film thickness) as well as the phase properties (e.g., 5% phenyl polysiloxane). The difference in the chemical properties between different molecules in a mixture and relative molecule affinity for the stationary phase of the column 200 can promote separation of the molecules as the sample travels the length of the column 200. The temperature of the capillary column 200 can be controlled by the column oven 230.

Molecules can be retained by the column 200 and then elute from the column 200 at a retention time. Differences in retention time for different molecules in a sample can be used to enable the analyte detector 240 (e.g., a mass spectrometer) to capture, ionize, accelerate, deflect, and detect the ionized molecules separately. The analyte detector 240 can do this by breaking a molecule into ionized fragments and detecting the fragments using a mass-to-charge ratio associated with each molecule.

The gas chromatography device 120 includes an exhaust valve 250 that can release gas to create a low-pressure region in the analyte detector 240. The low-pressure region created by the exhaust valve 250 can draw additional sample gas toward the analyte detector 240.

Figure 3:
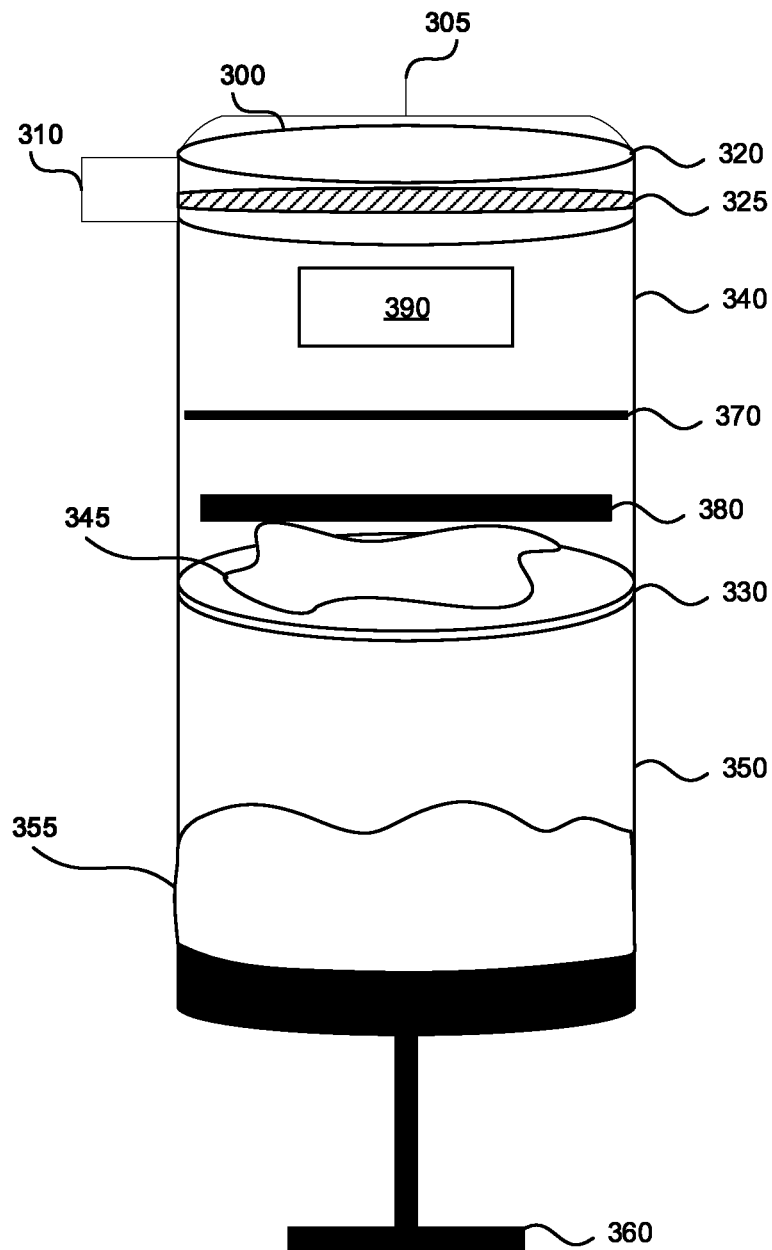
FIG. 3 illustrates an injection module configured to link with a gas chromatography device.

FIG. 3 illustrates an injection module 300 configured to link with a gas chromatography device 120 in FIG. 1. The injection module 300 includes a cylindrical body arranged to link with an injection port of a gas chromatography device 120. The cylindrical body of the injection module 300 can include a fastener 310 configured to couple with a fastener of an injection port of the gas chromatography device 120. Fastening the cylindrical body of the injection module 300 to the injection port can create a seal to prevent a gas from escaping. The fastener 310 can include, for example, a threaded fastener (e.g., male or female thread), a flange, a clamp (e.g., a band clamp), a retaining ring (e.g., a circlip), or any combination thereof.

The injection module 300 includes a cap 320 with permeable membrane 325. The cap 320 can reduce evaporative loss of volatile compounds. Upon removing the cap 320, the permeable membrane 325 can allow a gas (or liquid) to pass into the injection port 305 of the injection module 300. For example, a liquid can be injected which can vaporize into a gas upon contact with the injection port 305.

The injection module 300 includes a reservoir 340 for a physical sample 345 and a reservoir 350 for a known volume of solvent 355. The injection module 300 includes an internal membrane 330 disposed between the reservoir 340 for the sample 345 and the reservoir 350 for the solvent 355. The physical sample 345 can include a plant product (e.g., barley hops or other plant flower) and/or a chemical residue (e.g., suspected explosive material). The solvent 355 can include a liquid, a solid, a gas, and/or a supercritical fluid. The solvent 355 can have a known adsorption strength and eluting power. As the solvent molecules travel by the sample 345 in the sample reservoir 340, the solvent molecules can displace the analyte contained in the sample 345 by binding to the sample adsorbent, thereby replacing the analyte molecules. As the solvent molecules displace the analyte, the analyte can be carried into the injection port 305.

The injection module 300 includes a plunger 360 configured to expel at least a portion of the sample 345 and the solvent 355 from the injection module 300. The plunger 360 can have a substantially circular shape and extend to an inner edge of the cylindrical body of the injection module 300. The juncture between the plunger 360 and the cylindrical body of the injection module 300 forms a seal. The plunger 360 operates by moving laterally toward and/or away from the internal membrane 330 while maintaining the seal with the inner edge of the cylindrical body of the injection module 300. Operation of the plunger 360 can cause a sample 345 and solvent 355 mixture to enter an injection port of the gas chromatography device 120.

The injection module 300 includes a fill line 370. The fill line 370 can guide a user in a quantity of a sample 345 to insert into the sample reservoir 340. The fill line 370 can be used for a certain sample type (e.g., oils). The fill line 370 can increase injection reproducibility.

The injection module 300 can include a scale 380 (e.g., a digital scale). The scale 380 can be a thin strip inserted through the volume of the reservoir holding the physical sample 345. For example, the scale 380 can be a thin strip placed along a diameter of the sample reservoir 340. The scale 380 can be placed along the internal membrane 330. The scale 380 can be used when the injection port 305 of the injection module 300 is pointing upwards. The scale 380 can form the internal membrane 330.

The scale 380 can include a strain gauge configured to measure a change in an electrical parameter as a material is deformed under weight. For example, the scale 380 can include a piezoresistor, a fiber optic cable, a capacitive strain gauge, or any combination thereof. A piezoresistive material can be used to measure mechanical stress resulting from the weight of a sample 345. The measured mechanical stress can be used to calculate the weight of the sample 345. Fiber optic sensing can be employed to measure strain along an optical fiber disposed within the injection module 300. Measurements can be distributed along the fiber, or taken at predetermined points on the fiber. A capacitive strain gauge having a variable capacitor can be used to measure mechanical deformation. The measured mechanical deformation can be used to calculate the weight of the sample 345.

The injection module 300 can include a tracking device 390 (e.g., a barcode, GPS chip, and/or IoT chip). The tracking device 390 can be used for tracking and analyzing an analyte of the sample 345. A central tracking server can monitor analytes detected in the gas chromatography device 120 that are associated with a tracked injection module 300.

The injection module 300 can increase the accuracy of the gas chromatography device 120 by reducing contamination, decreasing sample loss, and increasing reproducibility. For example, the contamination can be reduced because the plunger 360 does not contact the sample 345 due to the fact that the plunger 360 is separated from the sample reservoir 340 by the internal membrane 330. Further, the solvent 355 introduced into the solvent reservoir 350 can reduce the contamination by dissolving the sample 345 and cleaning the injection module 300 as well as the injection port 305 of the injection module 300 and the injection port of the gas chromatography device 120.

Sample loss is reduced because a cap 320 prevents evaporation of the sample 345. The measurement reproducibility is increased because the fill line 370 can indicate an amount of the sample 345 contained in the sample reservoir 340. The fill line 370 can include multiple lines indicating various volumes. In addition, the weight scale 380, which can be positioned along the internal membrane 330, or can fully form the internal membrane 330, can indicate a mass of the sample 345. The weight scale 380 can be movable within the first chamber, for example to prevent the weight scale 380 blocking the injection port 305 of the injection module 300.

The internal membrane 330 disposed within the injection module 300 can define a first reservoir to receive the sample 345, and a second reservoir to receive a solvent 355 to dissolve the sample 345. The plunger 360 can push at least a portion of the sample 345 and a portion of the solvent 355 into the gas chromatography device 120. The plunger 360 can operate within the second reservoir and can be prevented by the membrane from coming into contact with the sample 345, thereby reducing the contamination of the sample 345.

The injection port 305 can guide the sample 345 into the gas chromatography device 120. The solvent 355 can be selected such that the solvent 355 can dissolve the sample 345 and can clean the injection port 305, thereby reducing contamination of the sample 345.

The cap 320 can close the first reservoir and can prevent the sample 345 from leaving the first reservoir, thereby reducing the loss of the sample 345 and increasing accuracy of the gas chromatography device 120. The injection port 305 can couple with the injection port of the gas chromatography device 120 to create a seal preventing any of the sample 345 from escaping.

The injection module 300 can receive the sample 345 by removing the cap 320 to expose an opening of the injection module 300. The injection module 300 can be positioned with the cap 320 pointing upward, and the plunger 360 pointing downward when receiving the sample 345, while the injection module 300 can be positioned with the cap 320 pointing downward and the plunger 360 pointing upward, when the injection port 305 is coupled to the injection port of the gas chromatography device 120.

The scale 380 can be disposed within the sample reservoir 340 to measure the weight of the sample 345 placed within the first reservoir, thereby increasing accuracy of the gas chromatography device 120. The scale 380 can be placed along a radius, when the injection module 300 is cylindrical, or along one or more diagonals when the injection module 300 is a rectangular prism. The scale 380 can also substantially cover the surface of the internal membrane 330. The scale 380 can communicate the measurements made to the user by, for example, displaying the measurements on a display attached to a scale 380. The scale 380 can also electronically communicate the measurements to another device, which can then display the measurements to the user.

Figure 4:
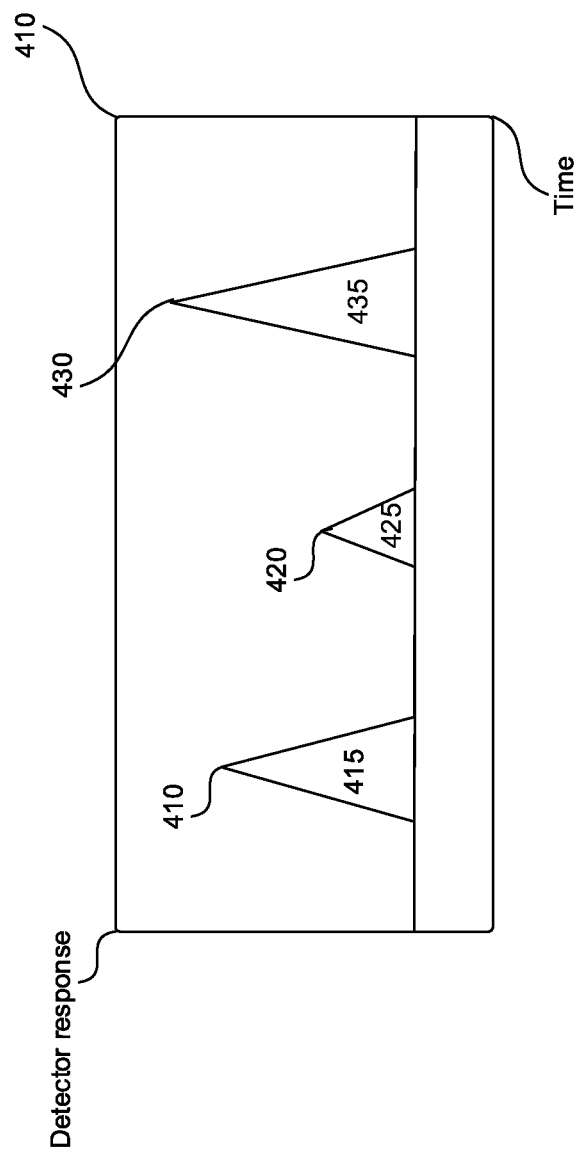
FIG. 4 shows that analyte information detected by a gas chromatography device can be used to produce a chromatogram.

FIG. 4 shows that analyte information detected by a gas chromatography device 120 in FIG. 1 can be used to produce a chromatogram 400. A chromatogram 400 can include a graph of detector responses at corresponding retention times. The chromatogram 400 indicates a spectrum of peaks 410, 420, 430 for a sample representing the analytes present in a sample eluting from the column 200 in FIG. 2 at different times. A chromatogram 400 is a record (such as a series of colored bands, or a graph) showing the result of separation of the components of a mixture by chromatography. The chromatogram 400 can correlate a time to a detector response. The time can indicate the time it took for an analyte to be detected by the detector 240 in FIG. 2 of the gas chromatography device 120. The pattern of peaks 410, 420, 430 can be constant for a sample under constant conditions and indicate one or more analytes (e.g., a single analyte, several analytes, and complex mixtures of analytes). One or more peaks 410, 420, 430 can represent one analyte. A mass spectrometer can be used to identify the analytes represented by the peaks.

The area 415, 425, 435 under a peak 410, 420, 430, respectively, is proportional to the amount of analyte present in the chromatogram 400. By using the mathematical function of integration, the area of the peak can be calculated. A concentration of an analyte in the sample is determined based on the calculated area under the peak. For example, concentration can be calculated using a calibration curve created by finding the response for a series of concentrations of an analyte. In an example, concentration can be calculated by determining the relative response factor of an analyte. The relative response factor is the expected ratio of an analyte to a standard (e.g., a known chemical concentration with a distinct retention time to the analyte). The relative response factor is calculated by finding the response of a known amount of analyte and a constant amount of standard.

Figure 5:
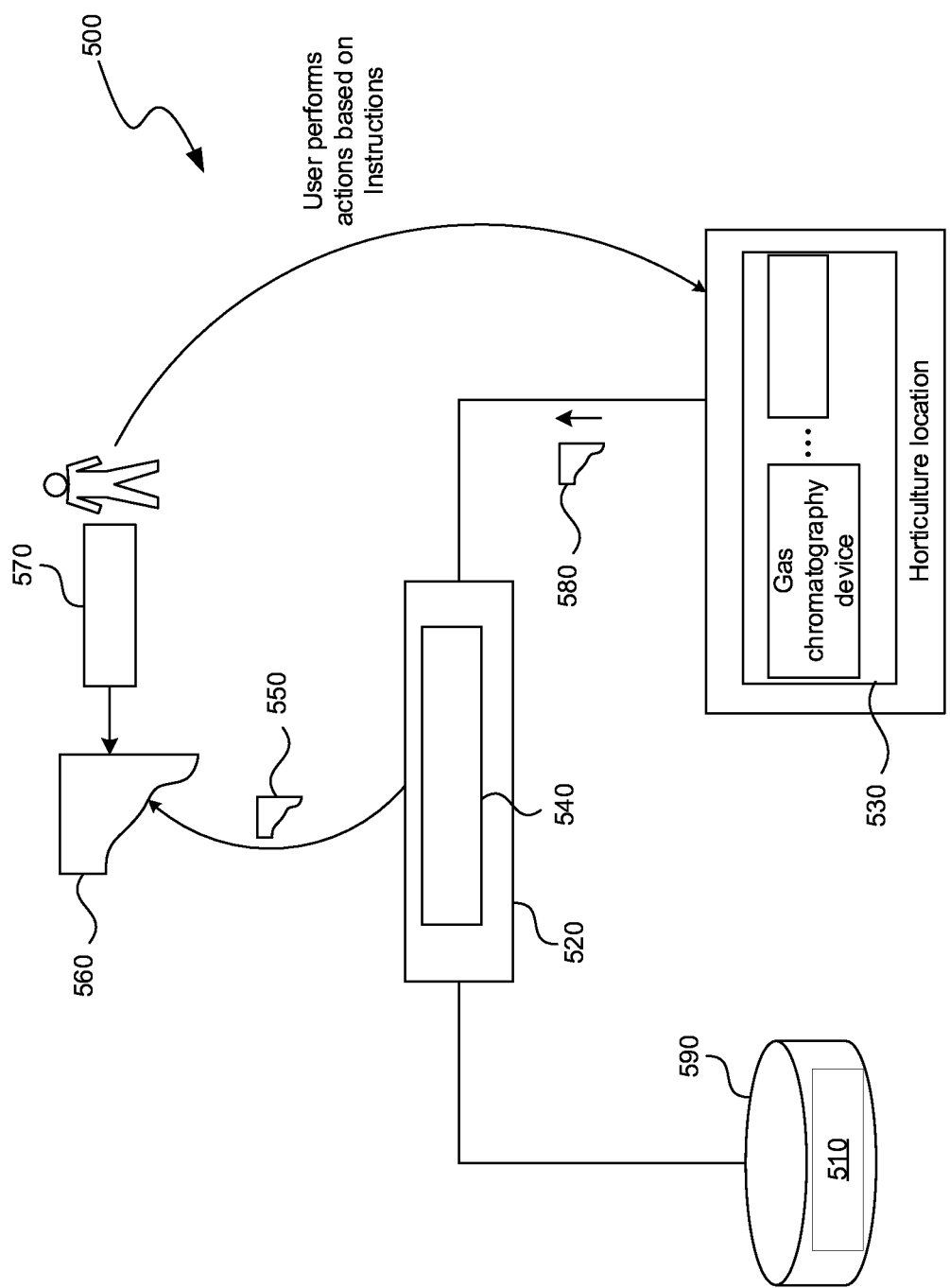
FIG. 5 is a block diagram of a horticulture management system.

FIG. 5 is a block diagram of a horticulture management system 500. A computer-implemented method can be used to identify analytes and determine concentrations of the analytes in a sample. A spectra library 510 stored on a database 590 can contain standard information of various analytes. For example, the spectra library 510 can indicate a known chemical concentration with a distinct retention time to various analytes. Comparative analysis can be employed to identify a correspondence between the given spectrum of a sample and one or more spectra stored in the spectra library 510. Due to a myriad of visual distortions that can take place due to variations in scale in a chromatogram, the computer-implemented method can outperform a human observer attempting to calculate a concentration based on a chromatogram. Computers can also simultaneously correlate more data (e.g., the retention times identified by chromatograph), to more accurately relate certain data.

The horticulture management system 500 includes a server 520 that can fetch data from a live data source 530, e.g., one or more network-connected devices, associated with a plant, and generate instructions for tending to the plant. The live data source 530 can include, for example, a gas chromatography device, a thermometer, a heat flux sensor (e.g., a pyranometer and/or Gardon gauge), a soil moisture sensor (e.g., a frequency domain sensor), a humidity sensor (e.g., a humistor), a photodetector, a pressure sensor, or any combination thereof. In some embodiments, the live data source 530 can also include a camera that provides an image of the plant or a portion of the plant. At least some of the live data sources 530 can be installed in association with a plant, e.g., a horticulture location such as a farm where the plant is grown.

The server 520 uses the fetched data to generate instructions for tending to the plant. For example, an analyte detected in a plant sample can be a particular plant hormone (e.g., abscisic acid) associated with stress. If a stress hormone is detected in combination with an environmental factor (e.g., low soil moisture, high solar irradiance, humidity out of range, etc.), instructions may be generated in accordance with the identified environmental factor. The environmental factor can be evaluated to determine if the environmental factor exceeds a threshold range. The threshold range can be specific to a plant type. For example, a tropical plant can be designated a different humidity range than a desert plant.

If a stress hormone is detected without an environmental factor, instructions can be generated indicating that the plant is stressed for an unknown reason. If a stress hormone is detected with multiple environmental factors, the system can evaluate each of the environmental factors to determine which, if any, are likely to be causing the stress. For example, the system can evaluate how far out of range each of the environmental factors are from a standard range. The system can generate instructions 550 indicating each of the environmental factors that are out of range or indicating an environmental factor furthest out of range. Determining which environmental factor is furthest out of range can be based, for example, on a percentage of exceedance from a point (e.g., termination point or mid-point) in the range.

The server 520 can employ an artificial intelligence (AI) engine 540 to generate various instructions 550 for tending to the plant. For example, the AI engine 540 can compare the live data 580 with data stored in a database 590, e.g., a spectra library 510 having standard information of various analytes. The AI engine 540 can perform comparative analysis to identify a correspondence between the given spectrum of a sample and one or more spectra stored in the spectra library 510. Based on the analysis performed by the AI engine 540, the AI engine 540 can generate a set of instructions 550 to be carried out by a user, e.g., a farmer, tending to the plant, such as to adjust the amount of water and/or sunlight fed to the plant; when to provide the water to the plant; feed, adjust the amount fed, or stop feeding a particular fertilizer; adjust the amount of a specified chemical compound in the soil, etc. The server 520 can present the set of instructions 550 in a graphical user interface (GUI) 560, which the user can access using a user device 570, such as a desktop computer, a laptop, a tablet PC, and/or a mobile phone including a smartphone.

The user can perform the necessary actions based on the set of instructions 550 presented in the GUI 560. In some embodiments, at least some of the live data 580 associated with the plant and/or environmental factors might change in response to the actions performed by the user. The live data source 530 continues to monitor the plant and the environmental factors after the user takes the necessary steps, and feeds the results, e.g., in the form of live data 580, to the server 520. The AI engine 540 performs the analysis using the changed live data 580 and generates the instructions 550 accordingly. In some embodiments, the feeding of live data 580 to the server 520, performing the analysis by the AI engine 540 and generating the instructions 550, and feeding the results of the instructions 550 back to the AI engine 540 forms a feedback loop, which helps in training the AI engine 540. In some embodiments, as the number of iterations of feeding back the live data 580 to the AI engine 540 increases, the AI engine 540 is trained more often and, therefore, the accuracy of the AI engine 540 in generating the instructions 550 also increases, which helps the user in tending to the plant efficiently.

In some embodiments, the accuracy of the AI engine 540 can be further increased by feeding it with live data 580 from live data sources 530 from multiple locations, e.g., live data sources 530 of multiple farms. By training the AI engine 540 with live data 580 from multiple farms, a farmer of one farm might benefit from a problem faced by another farmer of another farm and the solution provided to the other famer by the AI engine 540 to solve the problem. In some embodiments, at least a portion of the horticulture management system 500 can be implemented as a cloud platform having computing resources that are shared and accessible by live data sources 530 of multiple locations.

Standard information or known information, such as spectra library 510, that may be necessary to perform the analysis of the plant may be stored in the database 590. For example, an admin user may input such information to the server 520 for storing at the database 590, and/or the server 520 may be programmed to obtain such information from one or more third-party sources, such as those accessible over the Internet.

Figure 6:
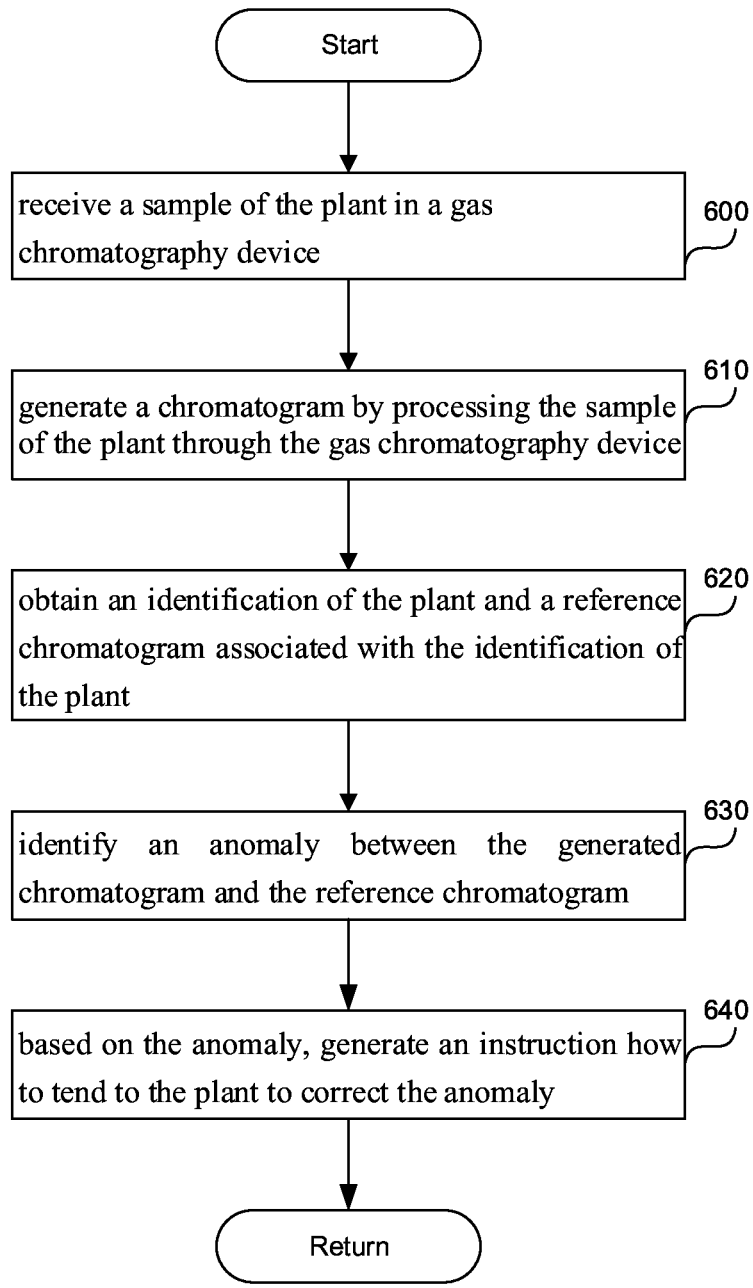
FIG. 6 is a flowchart of a method to generate an instruction of how to tend to a plant using the gas chromatography device.

FIG. 6 is a flowchart of a method to generate an instruction of how to tend to a plant using the gas chromatography device. In step 600, a processor can receive a sample of the plant in a gas chromatography device.

In step 610, the processor can generate a chromatogram by processing the sample of the plant through the gas chromatography device. The chromatogram can correlate a time and a response of a detector associated with the gas chromatography device.

In step 620, the processor can obtain an identification of the plant and a reference chromatogram associated with the identification of the plant. For example, to obtain the identification of the plants, the processor can receive the identification of the plant from a device associated with the user. In another example, to obtain the identification of the plant, the processor can obtain multiple chromatograms from the spectra library, where the multiple chromatograms can represent chromatograms of multiple various plants. The processor can determine a second chromatogram among the multiple chromatograms having a closest match to the generated chromatogram. The processor can obtain a plant identification associated with the second chromatogram and can provide the identification associated with the second chromatogram as the identification of the plant. To compare two chromatograms, the processor can compare a number of the peaks, a location of the peaks, a width of the peaks, a height of the peaks, an area underneath the peaks, etc.

To obtain the reference chromatogram, the processor can obtain multiple chromatograms associated with the plant currently being analyzed from the spectra library. The processor can calculate an average chromatogram based on the multiple chromatograms and an acceptable deviation from the average chromatogram. The acceptable deviation can be a standard deviation in a normal distribution. The reference chromatogram can include the average chromatogram and the acceptable deviation.

In step 630, the processor can identify an anomaly between the generated chromatogram and the reference chromatogram. To identify the anomaly, the processor can compare the chromatogram to the average chromatogram and the acceptable deviation. When a difference between the chromatogram and the average chromatogram is greater than the acceptable deviation, the processor can identify the anomaly. To compare two chromatograms, the processor can compare a number of the peaks, a location of the peaks, a width of the peaks, a height of the peaks, an area underneath the peaks, etc.

In step 640, based on the anomaly, the processor can generate an instruction of how to tend to the plant to correct the anomaly. In one example, based on identification of the plant and the anomaly, the processor can obtain from the database the instruction of how to tend to the plant. In a more specific example, the database can store previously successful treatments of the anomaly, such as when abscisic acid, stress hormone, is detected in the plan, a successful treatment is watering the plants.

In another example, to generate instruction of how to tend to the plant, the processor can obtain multiple environment measurements indicating multiple environment properties and multiple threshold ranges associated with the multiple environment measurements. The multiple environment properties can include a soil moisture, a solar irradiance, a humidity, a soil composition, the amount of water in the soil, a schedule of when the plant is watered, a schedule of when the plant is fertilized, a type of fertilizer, an amount of fertilizer, an air pressure, or a temperature. The multiple threshold ranges can indicate a range acceptable to the plant for each environment measurement. The threshold range can be specific to a plant type, e.g., a tropical plant can be associated with a different humidity range than a desert plant. When an environment measurement is outside of an associated range, the processor can generate the instruction to adjust an environment property associated with the out-of-range environment measurement.

To generate instructions of how to care for the plant, the processor, in addition to analyzing the plant sample, can analyze a sample of the soil in which the plant is growing. The processor can analyze a sample of the soil associated with the plant in the gas chromatography device to determine multiple chemical components contained in the sample of the soil. The processor can correlate the anomaly to a chemical component in the multiple chemical components contained in the sample of the soil. For example, the processor can recover from a database multiple ranges for chemical components of the soil and can determine which soil component is out of the range, or at an extreme end of the range. The soil component that is out of the range, or at the extreme end of the range can be correlated to the anomaly in the plant. The processor can generate an instruction to correct the soil component to address the anomaly.

The processor can determine how successful the instruction to tend to the plant is by analyzing the plant a second time, after the instruction has been executed and has had sufficient time to take effect. By analyzing the plant for the second time and determining whether the original anomaly is still present, the processor can determine whether the original instruction was successful. The determination of whether the original instruction was successful can be stored in the database, and can be provided to a user, the next time the same anomaly is detected. In addition, the determination can be used as data for training an artificial intelligence engine.

For example, the processor can receive a second sample of the plant. The second sample of the plant can be obtained after the instruction was executed. The processor can analyze the second sample of the plant. Based on the analysis of the second sample of the plant, the processor can determine a level of success of the instruction in addressing the anomaly.

In addition to the above-mentioned examples, various other modifications and alterations of the invention may be made without departing from the invention. The foregoing description of various embodiments is not intended to be exhaustive or to limit the claimed subject matter to the precise forms disclosed. Many modifications and combinations of embodiments will be apparent to one skilled in the art. Embodiments were chosen and described in order to describe principles of the invention and its practical applications, thereby enabling others skilled in the relevant art to understand the claimed subject matter, the various embodiments, and the various modifications that are suited to the particular uses contemplated.

Computer FIG. 7 is a diagrammatic representation of a machine in the example form of a computer system within which a set of instructions, for causing the machine to perform any one or more of the methodologies or modules discussed herein, may be executed.

Figure 7:
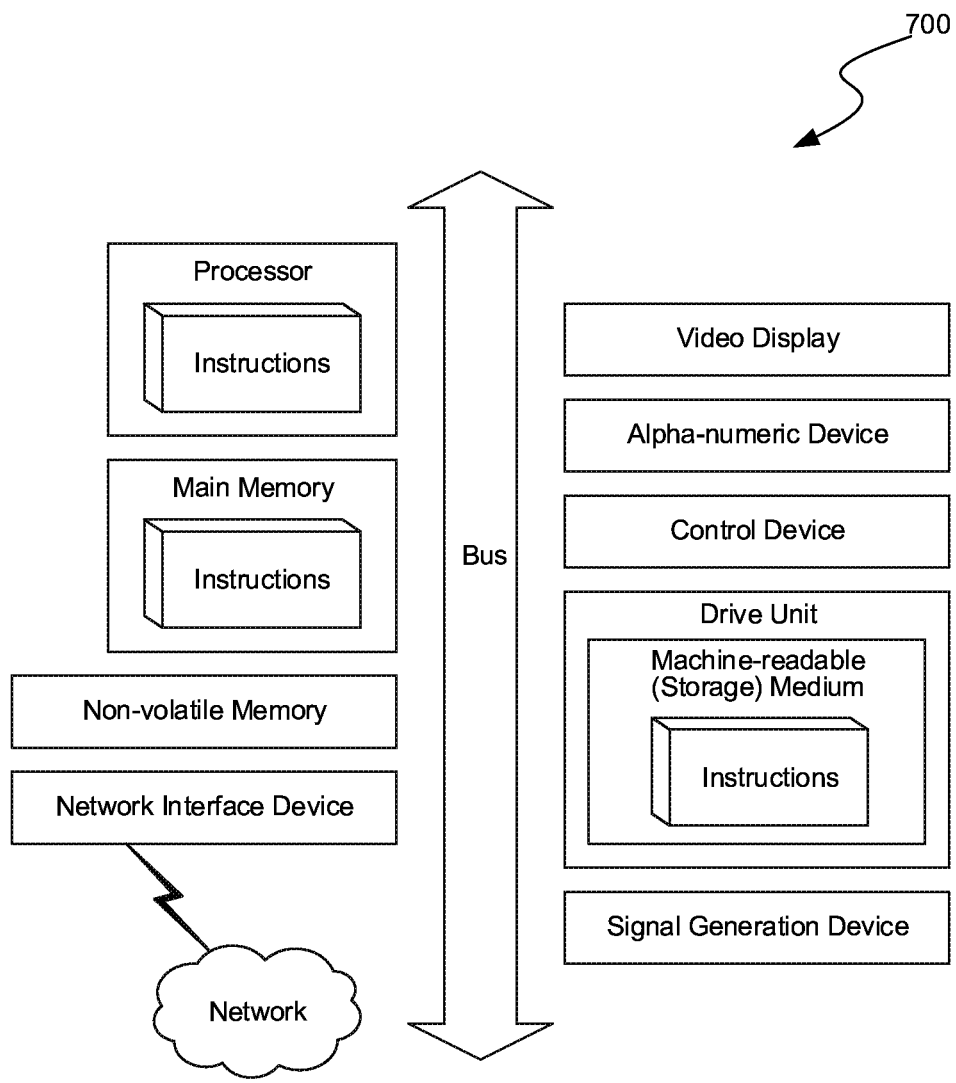
FIG. 7 is a diagrammatic representation of a computer system within which the above-described apparatus may be implemented, and within which a set of instructions for causing the machine to perform any one or more of the methodologies or modules discussed herein may be executed.

In the example of FIG. 7, the computer system includes a processor, memory, non-volatile memory, and an interface device. Various common components (e.g., cache memory) are omitted for illustrative simplicity. The computer system is intended to illustrate a hardware device on which any of the components described in the example of FIGS. 1-6 (and any other components described in this specification) can be implemented. The computer system can be of any applicable known or convenient type. The components of the computer system can be coupled together via a bus or through some other known or convenient device.

The processor can execute the methods described in this application. For example, the processor of the computer system 700 can be associated with the gas chromatography device 120 in FIG. 1, the detector 240 in FIG. 2, the server 520 in FIG. 5, the user device 570 in FIG. 5, or the database 590 in FIG. 5. The video display of the computer system 700 can present the GUI 570 in FIG. 5 and enable the user to interact with the system 500, or any components of the system 500 in FIG. 5. The main memory, nonvolatile memory, and/or the drive unit of the computer system 700 can support the database 590 in FIG. 5. The various devices described in the current application can communicate via the network shown in FIG. 7.

This disclosure contemplates the computer system taking any suitable physical form. As example and not by way of limitation, computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system may include one or more computer systems 700; be unitary or distributed; span multiple locations; span multiple machines; or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, a conventional microprocessor such as an Intel Pentium microprocessor or Motorola PowerPC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 700. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 700. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 7 reside in the interface.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

We claim:

1. An injection module to increase an accuracy of a gas chromatography device, the injection module comprising:
    a cylindrical outer structural framework arranged to couple with an injection port of the gas chromatography device;
    an internal membrane disposed within the injection module and defining a first reservoir to receive a sample, and a second reservoir to receive a solvent to dissolve the sample, the solvent to clean the injection port, thereby reducing contamination of the sample increasing the accuracy of the gas chromatography device;

a plunger to push at least a portion of the sample and a portion of the solvent into the gas chromatography device, the plunger to operate within the second reservoir and prevented by the internal membrane from coming into contact with the sample, thereby reducing the contamination of the sample and increasing the accuracy of the gas chromatography device;

a cap to close the first reservoir and to prevent the sample from leaving the first reservoir, thereby reducing loss of the sample and increasing the accuracy of the gas chromatography device;

a line associated with the first reservoir to indicate an amount of the sample placed within the first reservoir, thereby increasing the accuracy of the gas chromatography device; and a scale disposed within the first reservoir, the scale to measure a weight of the sample placed within the first reservoir, thereby increasing the accuracy of the gas chromatography device.

2. A system comprising:

an injection module to provide a sample of a material to a gas chromatography device and to reduce contamination of the sample, the injection module comprising:

an internal membrane disposed within the injection module and defining a first reservoir to receive the sample, and a second reservoir to receive a solvent to dissolve the sample; and a plunger to push at least a portion of the sample and a portion of the solvent into the gas chromatography device, the plunger to operate within the second reservoir and prevented by the internal membrane from coming into contact with the sample, thereby reducing the contamination of the sample.

3. The system of claim 2, the injection module comprising:

an injection port to guide the sample into the gas chromatography device; and the solvent to dissolve the sample, the solvent to clean the injection port, thereby reducing the contamination of the sample.

4. The system of claim 2, the injection module to increase an accuracy of the gas chromatography device by reducing loss of the sample, the injection module comprising:

a cap to close the first reservoir and to prevent the sample from leaving the first reservoir, thereby reducing the loss of the sample and increasing the accuracy of the gas chromatography device.

5. The system of claim 4, the cap comprising a permeable or a semipermeable internal membrane.

6. The system of claim 4, the injection module configured to receive the sample by removing the cap to expose an opening of the injection module.

7. The system of claim 2, the injection module to increase an accuracy of the gas chromatography device by increasing reproducibility of a measurement of the gas chromatography device, the injection module comprising:

a line associated with the first reservoir to indicate an amount of the sample placed within the first reservoir, thereby increasing the accuracy of the gas chromatography device.

8. The system of claim 2, the injection module to increase an accuracy of the gas chromatography device by increasing reproducibility of a measurement of the gas chromatography device, the injection module comprising:

a scale disposed within the first reservoir, the scale to measure a weight of the sample placed within the first reservoir, thereby increasing the accuracy of the gas chromatography device.

9. The system of claim 8, the scale formed into a thin strip disposed within the first reservoir.

10. The system of claim 8, comprising the scale disposed on the internal membrane.

11. The system of claim 2, wherein the sample includes a plant product, a chemical residue, or a combination thereof.

12. The system of claim 2, further comprising:

a tracking device comprising a barcode, a global positioning system chip, or an internet of things chip.

13. The system of claim 2, the injection module comprising a fastener configured to couple with a fastener of an injection port of the gas chromatography device.

14. The system of claim 13, the fastener of the injection module comprising a threaded fastener, a flange, a clamp, a retaining ring, or any combination thereof.

* * * * *